Nov. 24, 1936.  A. C. ZIMMERMAN ET AL  2,061,789
DEEP WELL PUMP
Original Filed Oct. 18, 1934  2 Sheets-Sheet 1
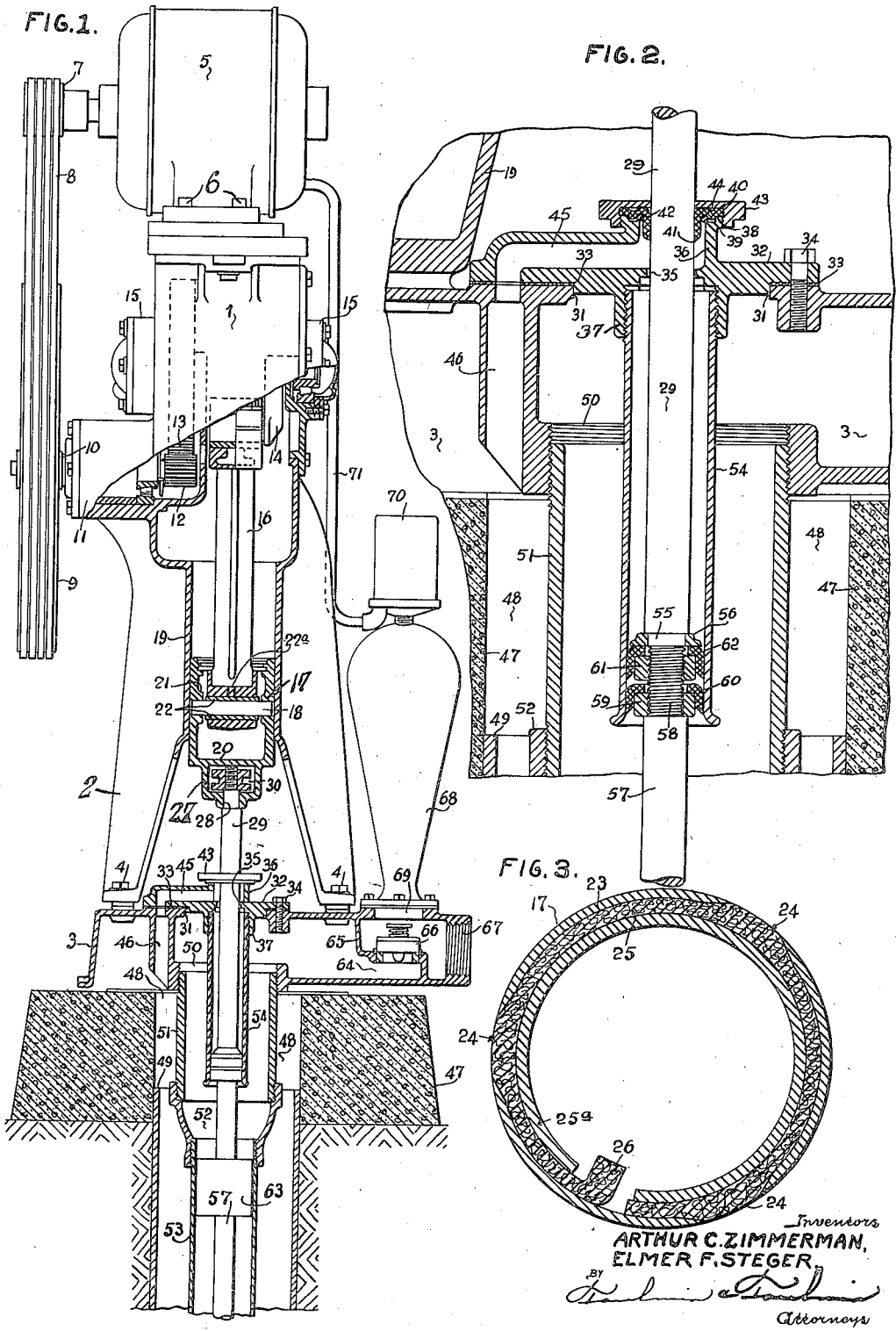
Inventors
ARTHUR C. ZIMMERMAN,
ELMER F. STEGER Inventors
ARTHUR C. ZIMMERMAN,
ELMER F. STEGER,
Attorneys Patented Nov. 24, 1936

2,061,789

UNITED STATES PATENT OFFICE 2,061,789

DEEP WELL PUMP

Arthur C. Zimmerman and Elmer F. Steger, Dayton, Ohio, assignors to The Duro Company, Dayton, Ohio, a corporation of Ohio Original application October 18, 1934, Serial No. 748,898. Divided and this application June 24, 1935, Serial No. 28,100

7 Claims. (Cl. 308—5)

It is an object of this invention to provide means for lubricating the crosshead whereby the bearing surface between the crosshead and its guide is thoroughly lubricated, and the pivotal connection between the wrist pin of the crosshead and its connecting rod is thoroughly lubricated.

It is an object of this invention to form the crosshead into a reservoir for oil and to support the wrist pin in the crosshead so that it will be lubricated by the bath of oil and at the same time the bath of oil will lubricate the surface of the crosshead and crosshead guide.

It is the further object to provide a crosshead constituting a reservoir for lubricant at one end and means of connecting a sucker rod to the crosshead at the other end.

It is an object to provide a crosshead which has the function of forming a lubricant reservoir for lubricating both the crosshead guide and exterior of the crosshead; and the wrist pin to which the pitman is attached.

This application is a division of application of Arthur C. Zimmerman and Elmer F. Steger, filed October 18, 1934, Serial No. 748,898 for deep well pump.

Referring to the drawings:

Figure 1 shows a deep well pump with the lower part thereof, the base and its foundation shown in section.

Figure 2 is a section through the base of the pump and the foundation upon which the pump is supported, together with part of the structure attached to the base.

Figure 3 is a section on the line 3—3 of Figure 5.

Figure 5:
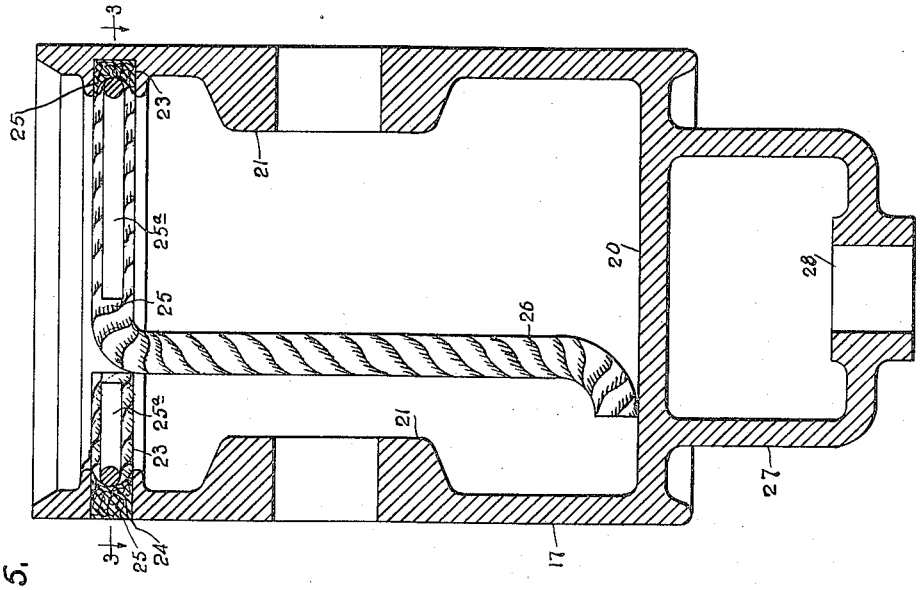
Figure 5 is a vertical section through the crosshead.
Figure 4:
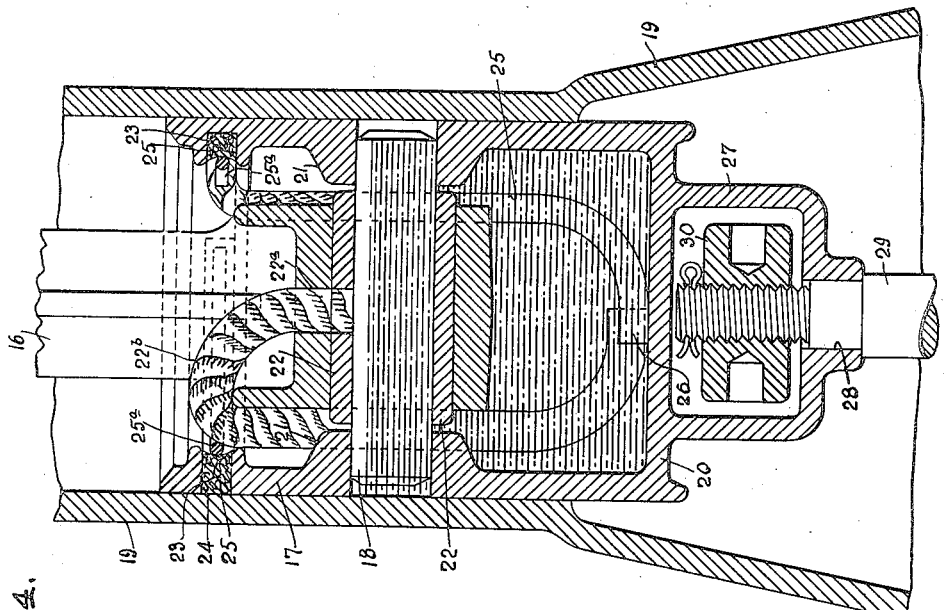
Figure 4 is a vertical section through the crosshead and the adjacent cooperating structure.

The whole pump organization is shown in Figure 1. The numeral 1 is used to designate a casing supported by means of legs 2 upon a hollow base 3. Bolts 4 are used for attaching the legs to the base. On top of the casing is a motor 5, attached to the casing by means of bolts 6. On the motor shaft is a pulley 7, which is operatively connected by means of a belt 8 to a pulley 9 mounted upon one end of a shaft 10, supported in suitable bearings located in a bearing housing 11.

On the end of the shaft 10, remote from the pulley 9, is a pinion 12 which engages a main gear 13 mounted upon a crankshaft 14, which is supported in bearings suitably located in two oppositely disposed housings 15 upon the pump casing 1. The crankshaft 14 is connected by means of a connecting rod 16 to a cup-shaped crosshead 17 by means of a pin 18. This connecting rod has one end connected to the wrist pin 18 and fits in the interior part of the cup-shaped crosshead.

This cup-shaped crosshead serves as a lubricant containing reservoir for supplying a lubricant to the wrist pin and to the outer surface of the crosshead, which is cylindrical and guided by a guide cylinder 19 formed integral with the lower part of the cylinder casing. The crosshead has a closed end 20 connected to a differential rod, later to be described. On the inside of the crosshead are two oppositely disposed bosses 21, through which holes extend for receiving the ends of the wrist pin. On the wrist pin between the two bosses is a bearing sleeve 22, which serves as a bearing between the connecting rod and the wrist pin. The part of the connecting rod adjacent the bearing sleeve 22 is provided with a lubricating hole 22a, through which a lubricant can pass to the bearing sleeve.

On the inside of the crosshead and adjacent the open end thereof there is a groove 23, connected by openings 24 to the outer bearing surface or face of the crosshead for the purpose of lubricating the outer surface or face of the crosshead. In this groove 23 is a wick 25, which has a free end 26 extending to the closed end of the crosshead. The wick is held in the groove by means of a snap ring 25a in the manner shown in Figures 2 and 3. To the closed end 20 of the crosshead there is attached a casing 27. In the present instance this casing is formed integral with the part 20 of the crosshead.

Extending through the side of the casing remote from the part 20 of the crosshead is a hole 28, through which one end of a differential rod 29 passes. On this end of the differential rod and within the casing 27 is a nut 30 for securely attaching the differential rod to the casing 27 and to the crosshead. The base immediately beneath the casing and the guide cylinder 19 has therein a hole 31, which may be closed by a differential head 32 attached to the base by means of screws 34.

Between the differential head and the base is a gasket 33 to prevent the leakage of water between the differential head and the base. The differential head is provided, in the center thereof, with a hole 35. Around this hole, on one side of the differential head, is a sleeve 36 which forms a differential housing, while on the other side of the differential head and around the hole is a sleeve 37, to which the upper end of a differential cylinder 54 is attached.

The end of the sleeve 36 remote from the differential head is flared at 38 to provide a seat 39, which is surrounded by the flared end of the sleeve. Mounted upon the flared end and upon the seat is a self-adjusting seal member 40, which has a hole therein through which the differential rod passes, and is provided with an apron 41, around the differential rod, to prevent water from passing up the differential rod and out at the top of the base. The apron part of the self-adjusting seal member is securely held against the differential rod by means of a snap ring 42 which rests upon the edge of the seat, and between the apron and the flared part of the free end of the sleeve 36.

Threaded onto the flared part of the free end of the sleeve 36 is a seal cap 43. When the cap is in position on the sleeve 36 the self-adjusting seal member has three distinct parts: First, the apron part, which immediately surrounds and engages the differential rod, and second, the part which is between the snap ring and the flared end of the sleeve, and third, a part between the cap and the outer surface of the flared end of the sleeve. This self-adjusting seal member is so made with relation to the cap that when the cap is in position a part of the seal member is forced down between the ring and the flared edge of the sleeve 36, thereby forming an annular trough 44 in the surface of the seal member adjacent the cap.

Extending from the differential housing is a drain passageway 45, which leads into a passageway 46 at one end of a water chamber formed in the base. These passageways conduct the water trapped in the differential chamber to the hole 48 formed in the concrete foundation 47 at the top of the well to which the pump is applied.

In the well there is the usual casing 49. The base 3 immediately beneath the hole 31 is provided with a hole 50, into which is threaded one end of a sleeve 51 which extends downwardly from the base. Threaded onto the lower end of the sleeve 51 is a reduction member 52 which has attached to its lower end in any suitable manner, as by screw threads, a drop pipe 53, which extends downwardly in the well casing 49.

In the differential cylinder, which is attached at one end to the sleeve 37, is a differential piston which is supported on the end of the differential rod 29 and the end of a sucker rod 57 attached to the differential rod in any suitable manner. The end of the differential rod adjacent the sucker rod 57 is reduced at 55 to receive a washer 56, and screwed into the sucker rod 57. This threaded end also carries the nut 59. Over this nut fits a cup-shaped packing or wiper member 60, and in engagement with this wiper member and threaded on the part 58 is a nut 61, which has fitting thereover a second cup-shaped wiper 62, which is engaged by the washer 56. The various wipers and nuts forming the differential piston are held in position by means of the washer 56 and the head on the sucker rod 57 formed by the reduced threaded part 58.

A wick 22b extends from the opening 22a over the adjacent flange on the connecting rod 16 and extends into the pool of lubricant in the crosshead 20.

In the upper end of the drop pipe 53 is a sucker rod guide 63 for the purpose of guiding the rod 57. The base has therein a water chamber 64 divided by means of a partition 65, which has therein a check valve 66 adapted to prevent the backflow of water through the water chamber into the well. After the water has passed through the partition it leaves the water chamber in the base through an outlet 67, to which a suitable pipe may be attached. Immediately above the check valve 66 the base is provided with an opening or hole 69, over which fits an air dome 68 attached to the base by means of suitable screws or bolts. On top of the air dome is a switch box 70, connected to the motor by means of a cable or conduit 71.

During the operation of the pump the crosshead reciprocates in the guide cylinder 19. The bearing surfaces between the crosshead and the guide cylinder are lubricated by a lubricant supplied by the wick. The lubricant travels along the wick and from the wick out from the openings 24 into engagement with the surface of the guide cylinder. The lubricant within the lubricant reservoir lubricates the wrist pin through the hole 22a.

During the operation of the pump any water that travels up the differential rod 29 is trapped in the differential housing, from which it passes through the passageways 45 and 46, back into the hole 48 formed in the foundation 47. By this means the lubricant is protected from contamination by becoming mixed with water. The lubricant, being housed within a lubricant reservoir and distributed therefrom in such a manner that only a sufficient amount is supplied for lubricating purposes, the lubricant cannot reach that part of the apparatus in which the water is moving and through which water passes. In other words, the lubricant is protected from water and the water is protected from lubricant.

It will be understood that we desire to comprehend within our invention such modifications as come within the scope of our claims and our inventions.

Having thus fully described our invention, what we claim as new and desire to secure by Letters Patent, is:

1. A combination crosshead and lubricant reservoir consisting of a cup-shaped member defining a reservoir adapted to contain lubricant and having an annular inner groove adjacent its open end and openings leading from the groove to the outer surface of said member, a lubricant bearing wick disposed in said groove and having one end thereof extending downwardly into the contained lubricant, and a snap ring holding the wick in the groove, whereby lubricant is conveyed from the reservoir upwardly by capillarity through the openings to the outer surface of the member by the wick.

2. A combination crosshead and lubricant reservoir consisting of a cup-shaped member having an outer bearing surface, an inner annular groove adjacent its open end and openings leading from the groove to said surface, a wick positioned in said groove and extending towards the closed end of said member, whereby to convey lubricant upwardly to the outer bearing surface, and a snap ring holding the wick in the groove.

3. A combination crosshead and lubricant reservoir consisting of a cup-shaped member having an outer bearing surface, and means for conveying the lubricant from the interior of said reservoir to said surface, said last-named means comprising a wick annularly disposed in said member and having areas exposed to the exterior thereof and having one end adapted to be immersed in the lubricant in said reservoir, whereby to convey lubricant upwardly from said reservoir in an annular path and to the bearing surface of said member.

4. In a lubricant system in a pump, a guide casing, a crosshead reciprocating therein closed at one end to form a lubricant pool, a wrist pin mounted in the side walls of said crosshead, a pitman mounted on said wrist pin, a wick annularly disposed within said crosshead adjacent the open end thereof and extending from said lubricant pool to points on the exterior of said crosshead to lubricate the surface between the crosshead and the casing, and a second wick extending from said lubricant pool to a point adjacent the pitman and the wrist pin for lubricating the bearing therebetween remote from the ends of the bearing, both of said wicks being adapted to convey lubricant upwardly from the reservoir to the respective surfaces.

5. In a combination, a power head for a pump comprising a source of motive power, a crank and pitman driven thereby, a crosshead on said pitman connected thereto by a wrist pin mounted in the crosshead, a power head casing for supporting said source of motor power, crank and guiding said crosshead, a sucker rod connected to the bottom of said crosshead, said crosshead comprising a lubricant reservoir having wicks therein adapted to convey lubricant upwardly by capillarity from the lubricant reservoir to lubricate said wrist pin and the surface of said crosshead and crosshead guide.

6. In combination, a crosshead guide, a crosshead comprising a cup-shaped member constituting a reservoir with laterally disposed ports through the sides thereof communicating with the surface of the crosshead guide, said crosshead containing lubricant and wick means adapted to convey the lubricant upwardly and through the openings in the sides of the crosshead between walls of the crosshead guide and means of supporting a wrist pin in at least a portion of said side wall openings of the crosshead and wick means adapted to convey lubricant upwardly to said wrist pin whereby the wrist pin and crosshead guide are lubricated entirely by the force of capillarity.

7. In combination, a crosshead comprising a cup-shaped body to form a lubricant chamber, said crosshead having a plurality of ports in the walls thereof and an annular chamber connecting said ports to one another and to the interior of the crosshead, a wick extending upwardly from the interior of the crosshead and through said annular chamber and into said ports whereby a lubricant in said crosshead will be conveyed upwardly by capillarity to the exterior thereof by said wick through said ports.

ARTHUR C. ZIMMERMAN.
ELMER F. STEGER.